July 17, 1928.
J. A. JEFFERY
SAGGER
Filed Jan. 2, 1926
1,677,452
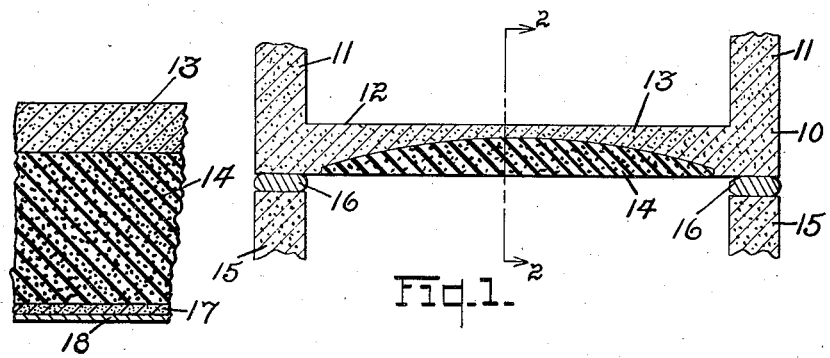
Fig.1.
Fig.2.
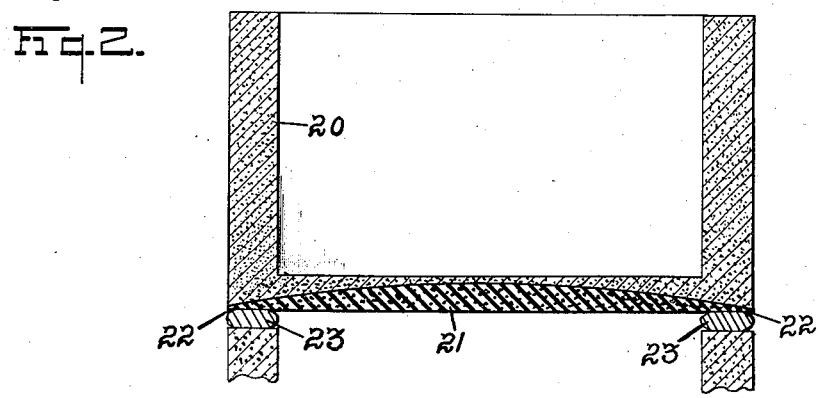
Fig.3.
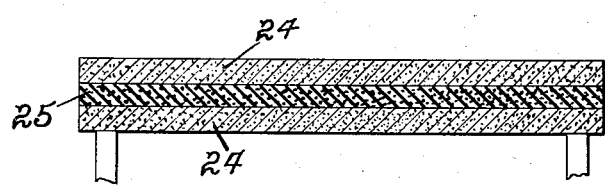
Fig.4.
Inventor
Joseph A. Jeffery
By Owen & Owen
Attorneys.

Patented July 17, 1928.

1,677,452

UNITED STATES PATENT OFFICE.

JOSEPH A. JEFFERY, OF DETROIT, MICHIGAN, ASSIGNOR TO CHAMPION PORCELAIN COMPANY, A CORPORATION OF MICHIGAN.

SAGGER.

Application filed January 2, 1926. Serial No. 79,018.

My invention has for its object to provide ceramic bodies which will neither decompose nor bend at relatively high temperatures. The invention particularly relates to kiln furniture, such as saggers, furnace linings, and other refractory bodies or articles which are subjected to high temperatures and portions of which are so suspended or sustained that they are subjected to bending stresses, either by their own weight alone or by the added weight of sustained bodies.

Ceramic bodies formed of alumina, silica and a flux, in proper proportions, may be made quite refractory, and do not decompose at high temperatures, but such bodies may be bent out of shape by comparatively little strain at high temperatures. Bodies formed of silicon carbide are highly refractory and retain their strength well at high temperatures; but the silicon carbide decomposes at high temperatures sufficiently to give off a troublesome carbonaceous gas.

My improved bodies or articles are made of a refractory alumina and silica compound or similar material with layers or portions of silicon carbide in such amounts and such locations as necessary to provide the proper strength, the carbide being sufficiently covered by the said refractory compound to prevent deleterious effects from its decomposition.

The details and minor objects of the invention will appear as the description proceeds.

In the accompanying drawing, forming a part of this specification, Fig. 1 is a cross section of a sagger embodying my invention; Fig. 2 is an enlarged fragmentary section on the line 2—2, Fig. 1; Fig. 3 is a view similar to Fig. 1, showing a slightly modified form of sagger; Fig. 4 is a section of a slab embodying my invention and useful for a variety of purposes.

The sagger 10, shown in Fig. 1, has side walls 11, which are shown broken off and which may be of any desired height, and a bottom 12.

The sides are shown as being made entirely of a refractory alumina-silica composition 13, while the bottom is shown partly of the same material as the sides and partly of silicon carbide 14. The sagger is adapted to rest upon the walls 15 of a subjacent sagger, clay pads 16 being interposed between the two saggers. This leaves the bottom unsupported except at its edges, so that the bottom requires sufficient stiffness to support its own weight and the weight of any articles placed in the sagger. Therefore, while the side walls are strong enough without reinforcement, the bottom is strengthened by the stiffening layer of silicon carbide.

In the example shown, the layer of silicon carbide is lenticular in shape, so as to be thickest where the greatest strength is needed, and is completely covered on the upper side with the other refractory material, so that no carbonaceous fumes will escape from the silicon carbide into the sagger and discolor any ware therein.

In order to prevent the escape of carbonaceous gas downward into the lower sagger, the bottom of the layer of silicon carbide may be covered with refractory material similar to that which forms the rest of the sagger, or it may be glazed. It is difficult, if not impossible, to apply a satisfactory glaze directly to silicon carbide, and I prefer to cover the bottom of the carbide with a thin layer 17 of the other refractory material, and then apply a glaze 18 to this material, so as to make it gas tight. The thickness of layers 17 and 18 are exaggerated in Fig. 2 for purposes of illustration.

While ordinary fireclay or other refractory clay might be employed for the main body of the article, such materials shrink, when fired, to such an extent that it is difficult to form a satisfactory union between them and the silicon carbide. Therefore I prefer to use an alumina-silica compound which is anhydrous, or which contains so little water that its shrinkage is comparatively negligible. Materials satisfactory for this purpose are artificial sillimanite, minerals of the sillimanite group, and other compounds of alumina and silica, such as dumortierite, which, when fired to the necessary temperature, produce artificial sillimanite or mullite without great change in volume.

Among the materials mentioned, andalusite and dumortierite are particularly desirable, as they may be applied green to the silicon carbide and, upon firing, will not change materially in volume, even when fired above the point where they are transformed into artificial sillimanite. Furthermore, they make an excellent foundation for a glaze. Andalusite, with the admixture of such plastic and fluxing materials as necessary, is the preferred form of refractory for the main body of the article.

In Fig. 3, a sagger 20 is shown which is similar to the sagger shown in Fig. 1 except that it has the layer of silicon carbide 21 extended entirely across the bottom so that its edges 22 rest upon the supports 23. It will be clear that the thickness, extent and location of the reinforcing portions of silicon carbide will be dependent upon the strains which the article is intended to withstand, and that the examples given in Figs. 1 and 2 are by way of illustration.

In Fig. 4 there is shown a slab composed of similar layers 24 of the alumina-silica compound and an intermediate layer 25 of silicon carbide. In the illustration, the three layers are shown of substantially equal thickness, but it is clear that any of the layers may be made thicker or thinner as the intended use may make advisable, and that many other forms and arrangements of the two materials may be made to meet demands of various uses to which the articles are to be put.

The saggers shown are very well adapted for the firing of porcelaineous bodies, particularly when such bodies are white and discoloration would be detrimental, but this particular use is merely one for which the invention is particularly adapted, and my invention is capable of a wide variety of forms and uses within the terms of the appended claims.

What I claim is:

1. A silicon carbide body covered by a refractory alumina-silica compound which does not change materially in volume from the green state in which the compound is applied to the body when fired to a high temperature, the layer of the alumina-silica compound being of sufficient thickness to be injured by any material change in volume relative to the silicon carbide.

2. A silicon carbide body covered by a refractory material of which the greater part is a mineral aluminum silicate which, upon firing to a high temperature, is transformed into artificial sillimanite without material change in volume.

3. A silicon carbide body covered by a refractory material, the greater part of which is formed from andalusite.

4. A silicon carbide body covered by a refractory alumina-silica compound which does not change materially in volume when fired to a high temperature, and a glaze covering said compound.

5. A refractory body comprising a layer of silicon carbide covered by a layer of andalusite and a refractory glaze covering said andalusite.

6. A refractory alumina-silica body which does not change materially in volume when fired to a high temperature, reinforced, at points where it is to be subjected to bending at high temperatures, by a layer of silicon carbide.

7. A refractory body composed chiefly of a mineral aluminum silicate which, upon firing to a high temperature, is transformed into artificial sillimanite without material change in volume, reinforced, at points where it is intended to withstand bending strain at high temperatures, by a layer of silicon carbide.

8. A refractory body composed chiefly of andalusite and reinforced, at points where it is to be subjected to bending strain at high temperatures, by a layer of silicon carbide.

9. A refractory alumina-silica body which does not change materially in volume when fired to a high temperature, reinforced, at points where it is to be subjected to bending at high temperatures, by a layer of silicon carbide, the layer of silicon carbide being surrounded by said refractory material.

10. A sagger formed of a refractory material which does not change materially in volume when heated to a high temperature and which does not decompose when heated to a high temperature, and having its bottom reinforced by a layer of silicon carbide covered by said material.

11. A sagger formed of a refractory alumina-silica compound which does not change materially in volume when fired to a high temperature, and having its bottom reinforced by a layer of silicon carbide covered by said material.

12. A sagger made of a refractory material composed chiefly of a mineral aluminum silicate which upon firing is transformed into artificial sillimanite without material change in volume, the bottom of the sagger being reinforced by a layer of silicon carbide, the said layer being covered by said refractory material.

13. A sagger formed from a refractory material composed chiefly of andalusite, the bottom of the sagger being reinforced by a layer of silicon carbide covered by said refractory material.

14. A sagger formed from a refractory alumina-silica compound which does not change materially in volume upon firing to a high temperature, the bottom of the sagger being reinforced by a plano-convex layer of silicon carbide, said layer being covered by said refractory material.

15. A sagger formed from a refractory alumina-silica compound which does not change materially in volume upon firing to a high temperature, the bottom of the sagger being reinforced by a plano-convex layer of silicon carbide, said layer being covered by said refractory material, the said refractory material being glazed at points where it is thin over the silicon carbide.

16. A sagger formed from a refractory material composed chiefly of andalusite, and having its bottom reinforced by a plano-convex layer of silicon carbide.

17. A sagger having its side walls composed of a refractory material formed chiefly from andalusite, and having its bottom reinforced by a layer of silicon carbide covered by said refractory material, the said layer of silicon carbide being plano-convex with its convex side upward and with its lower side covered by a comparatively thin layer of said refractory material.

In testimony whereof, I have hereunto signed my name to this specification.

JOSEPH A. JEFFERY.